United States Patent
Nishina et al.

(10) Patent No.: US 7,842,267 B2
(45) Date of Patent: Nov. 30, 2010

(54) EXHAUST EMISSION PURIFYING APPARATUS FOR ENGINE

(75) Inventors: Mitsuhiro Nishina, Ageo (JP); Toshikazu Katou, Ageo (JP)

(73) Assignee: Nissan Diesel Motor Co., Ltd., Ageo-shi, Saitama (JP)

( * ) Notice: Subject to any disclaimer, the term of this patent is extended or adjusted under 35 U.S.C. 154(b) by 0 days.

(21) Appl. No.: 12/793,604

(22) Filed: Jun. 3, 2010

(65) Prior Publication Data

US 2010/0236220 A1  Sep. 23, 2010

Related U.S. Application Data

(60) Division of application No. 11/812,871, filed on Jun. 22, 2007, which is a continuation of application No. PCT/JP2005/017244, filed on Sep. 20, 2005.

(30) Foreign Application Priority Data

Dec. 24, 2004  (JP) ............... 2004-373889

(51) Int. Cl.
  *B01J 8/00* (2006.01)
  *F01N 3/00* (2006.01)
(52) U.S. Cl. ............ 423/237; 423/235; 60/286; 60/283; 60/285; 60/301; 73/53.01; 73/61.76
(58) Field of Classification Search .......... 60/286, 60/283, 285, 301; 73/53.01, 61.76; 423/237, 423/235
See application file for complete search history.

(56) References Cited

U.S. PATENT DOCUMENTS

| | | | |
|---|---|---|---|
| 6,063,350 A | 5/2000 | Tarabulski et al. | |
| 6,266,955 B1 | 7/2001 | Liang et al. | |
| 6,363,771 B1 | 4/2002 | Liang et al. | |
| 2006/0051276 A1 | 3/2006 | Schaller | |
| 2007/0163238 A1 | 7/2007 | Gerlach | |

FOREIGN PATENT DOCUMENTS

| | | |
|---|---|---|
| JP | 2000-027627 | 1/2000 |
| JP | 2001-228004 | 8/2001 |
| JP | 2002-527660 | 8/2002 |
| JP | 2002-371831 | 12/2002 |
| JP | 2003-529011 | 9/2003 |
| JP | 2004-510151 | 4/2004 |
| JP | 2005-133541 | 5/2005 |

(Continued)

*Primary Examiner*—Kiley Stoner
*Assistant Examiner*—Erin B Saad
(74) *Attorney, Agent, or Firm*—McDermott Will & Emery LLP

(57) ABSTRACT

A technology for purifying an exhaust emission from an engine is provided, in which a misjudgment caused by a time lag between the abnormality detection and an abnormality judgment is avoided, in the case where a plurality of abnormalities is judged on the aqueous solution of a reducing agent or the like. After a first abnormality judgment (Femp=1: the time t2) is made, when a second abnormality is detected as a result that the concentration Dn as a state parameter is directly shifted from a first region A to a second region C (the time t3), the first abnormality judgment is maintained for a predetermined period of time PRD after the second abnormality detection.

13 Claims, 9 Drawing Sheets

FOREIGN PATENT DOCUMENTS

| | | |
|---|---|---|
| WO | WO-00-21881 | 4/2000 |
| WO | WO-00-75643 | 12/2000 |
| WO | WO-02-27280 | 4/2002 |
| WO | WO 2004/042208 | 5/2004 |
| WO | WO 2004/089516 | 10/2004 |

EXHAUST EMISSION PURIFYING APPARATUS FOR ENGINE

This application is a divisional application of U.S. patent application Ser. No. 11/812,871, filed on Jun. 22, 2007, which is a continuation of International Application No. PCT/JP2005/017244, filed on Sep. 20, 2005, both of which are hereby incorporated by reference in their entirety for all purposes.

BACKGROUND OF THE INVENTION

1. Field of the Invention

The present invention relates to an exhaust emission purifying apparatus for an engine, and in particular, to a technology for purifying nitrogen oxides emitted from the engine by using ammonia as a reducing agent.

2. Description of the Related Art

There has been known the following SCR (Selective Catalytic Reduction) apparatus, as an apparatus for purifying, by the post-treatment, the air pollution offender emitted from an engine, in particular, nitrogen oxides (to be referred to as "$NO_R$") in the exhaust gas. In this apparatus, an injection device for an aqueous solution of ammonia or a precursor thereof is disposed in an exhaust passage of the engine, and injected ammonia is used as a reducing agent to be reacted with $NO_x$ on a catalyst, to thereby reduce and purify $NO_R$. Further, there has also been known a SCR apparatus in which, taking the ammonia storability on a vehicle into consideration, urea being the ammonia precursor is stored in a tank in an aqueous solution state, and in actual operations, the urea water supplied from the tank is injected into an exhaust passage, to thereby generate ammonia by the urea hydrolysis utilizing the exhaust heat (refer to Japanese Unexamined Patent Publication No. 2000-027627, paragraph number 0013).

The applicant of this invention has reviewed the application of the SCR apparatus to the exhaust gas purification in an on-vehicle engine. In order to inject the urea water of amount precise for a NO emission amount from the engine and to satisfactorily perform the NO reduction-reaction, it is important from a practical view point that a urea sensor is disposed in a urea water tank, and the actual urea concentration (hereunder, the simply called "concentration" indicates the urea concentration) is reflected onto controlling of the engine and the SCR apparatus. At the present day, there has been developed a urea sensor in which a heater and a resistance temperature sensor are disposed in an insulation state, and focusing attention on a heat transfer characteristic of the urea water according to the urea concentration, the actual urea concentration is detected based on an electric resistance value of the resistance temperature sensor (refer to Japanese Unexamined Patent Publication No. 2001-228004).

The applicant of this invention has already disclosed an exhaust emission purifying apparatus for an engine which adopts a temperature sensitive urea sensor in the past filed Japanese Patent Application No. 2003-366737. In this apparatus, the urea concentration is detected by the urea sensor, and also, when a high concentration above a normal region is detected, a judgment is made that a residual amount of the urea water is deficient, whereas when a low concentration below the normal region is detected, a judgment is made that the urea water is in a dilute state equal to or near the water, and accordingly, the urea concentration is abnormal. When either one of the judgments is made, measures are taken to stop the urea water injection and the like. Further, in this apparatus, particularly in the latter case where the low concentration is detected, when this low concentration is repetitively detected for the predetermined number of frequencies, this low concentration is adopted as an established value so that that the reliability of the detected concentration is ensured (refer to FIGS. 7 and 9 of the above prior application).

However, there is the following problem in such an exhaust emission purifying apparatus in which the detection of the concentration higher or lower than the normal region and the abnormality judgment corresponding to this detection are not performed simultaneously, and consequently, there appears a time lag between the former detection and the latter judgment. Namely, in the case where a driver inadvertently or intentionally replenishes the water or the diluted urea water after it is judged that the residual amount of the urea water is deficient, the judgment of the residual amount deficiency is cancelled, but the judgment of the abnormal concentration is made belatedly by a period of time corresponding to the above time lag, after the replenishment. Therefore, it is impossible to take the measures to the abnormal concentration during the time lag, and accordingly, there is a possibility that unpurified NO is discharged into the atmosphere.

SUMMARY OF THE INVENTION

The present invention has an object to provide a technology for judging a plurality of abnormalities on the aqueous solution of a reducing agent or the precursor thereof, and also, in the case where there exists a time lag between the abnormality detection and the abnormality judgment, for avoiding a misjudgment caused by this time lag.

The present invention provides an exhaust emission purifying apparatus for an engine. The exhaust emission purifying apparatus for the engine according to the present invention, which adds a reducing agent for NOx to the exhaust gas of the engine to reduce $NO_x$ in the exhaust gas, is configured to include a tank for storing the reducing agent to be added to the exhaust gas or the precursor thereof, in an aqueous solution state. In this apparatus, a predetermined state parameter on the aqueous solution is detected based on a thermal characteristic of the aqueous solution stored in the tank, and when the detected state parameter is within an abnormal region other than a predetermined region defined as a normal region, a predetermined abnormality on the aqueous solution is detected, and also, after the abnormality is detected, an abnormality judgment is made upon an establishment of a predetermined determinate condition. Further, a first abnormality is detected when the detected state parameter is within a first region in the abnormal region, whereas a second abnormality is detected when the detected state parameter is within a second region defined as a different region from the first region in the abnormal region, and further, a first abnormality judgment is made in association with the first abnormality detection, and also, a second abnormality judgment is made in association with the second abnormality detection. Further, after the first abnormality judgment is made, when the second abnormality is detected as a result that the detected state parameter is directly shifted from the first region to the second region, the first abnormality judgment is maintained for a predetermined period of time from the detection of the second abnormality concerned.

In the present invention, there exists a time lag necessary for establishing the predetermined determinate condition from the detection of the state parameter within the abnormal region to the performance of the abnormality judgment that is determined in association with this detection. Here, in the present invention, after the first abnormality judgment is made, when the second abnormality is detected as a result that the detected state parameter is directly shifted from the first region to the second region, the first abnormality judgment is maintained for the predetermined period of time from the second abnormality detection. Therefore, despite of existence of the time lag, it is possible to avoid a misjudgment of normality on the aqueous solution of the reducing agent.

The other objects, features, advantages and various aspects of the present invention will become more apparent from the ensuing description of preferred embodiments with reference to the accompanying drawings.

It should be appreciated that the entire contents of Japanese Patent Application No. 2004-373889, a priority of which is claimed, is incorporated herein by reference.

DESCRIPTION OF THE PREFERRED EMBODIMENTS

Hereunder, there will be described preferred embodiments of the present invention, referring to the accompanying drawings.

Figure 1:
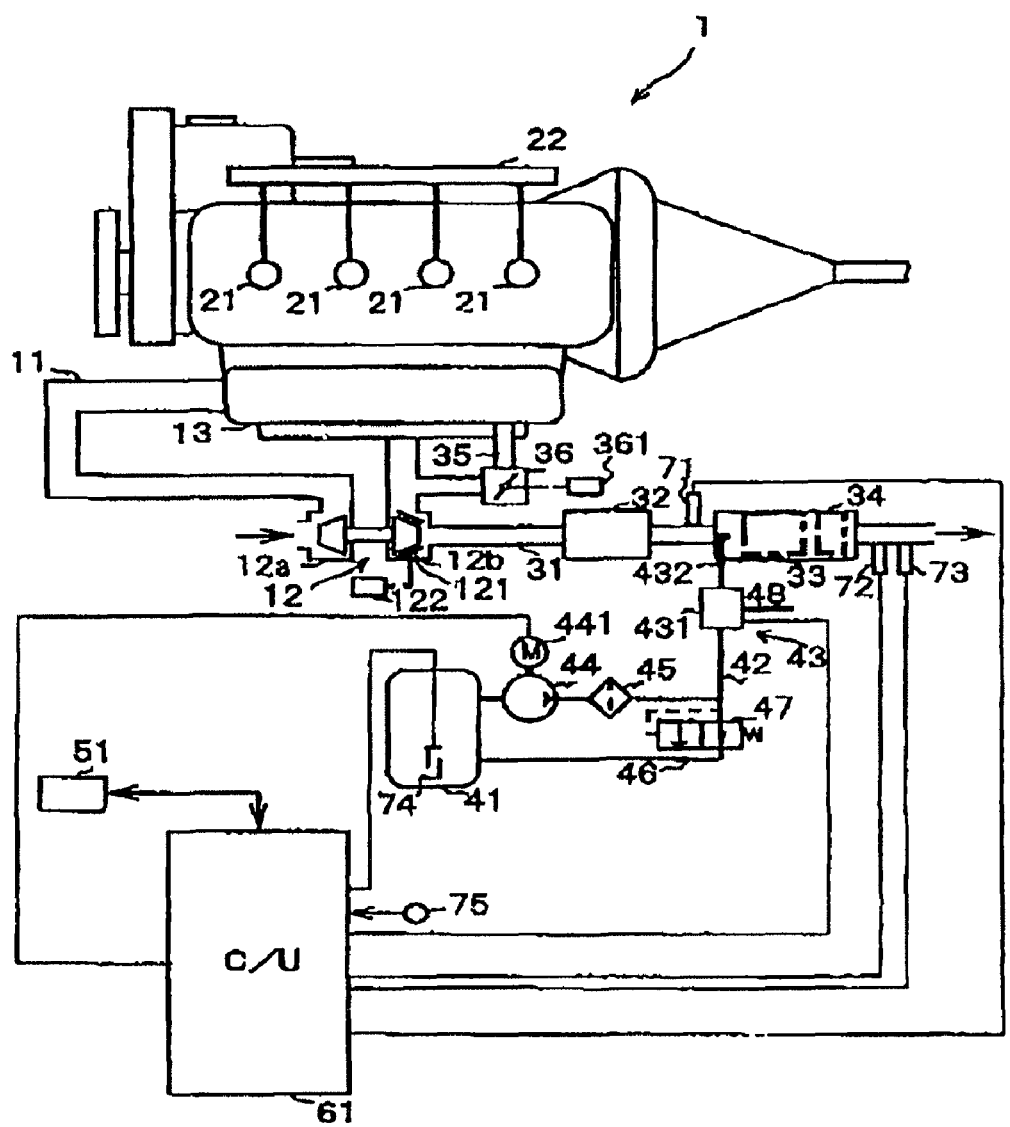
FIG. 1 is a diagram showing a configuration of an engine according to one embodiment of the present invention.

FIG. 1 shows a configuration of an automobile engine (to be referred to as "engine" hereunder) 1 according to one embodiment of the present invention. In the present embodiment, a direct injection type diesel engine is adopted as the engine 1.

In an intake passage 11, an air cleaner (not shown in the figure) is attached to an introduction thereof, and dust in an intake air is removed by this air cleaner. In the intake passage 11, a compressor 12a of a variable nozzle type turbocharger 12 is disposed, and the intake air is compressed by the compressor 12a to be sent out. The compressed intake air is flown into a surge tank 13, and is distributed to each cylinder in a manifold.

In an engine body, to a cylinder head, an injector 21 is disposed for each cylinder. The injector 21 operates in response to a signal from an engine control unit (to be referred to as "engine C/U", hereunder) 51. Fuel sent out by a fuel pump (not shown in the figure) is supplied to the injector 21 via a common rail 22, to be injected to the inside of a combustion chamber by the injector 21.

In an exhaust passage 31, a turbine 12b of the turbocharger 12 is disposed on the downstream of a manifold. The turbine 12b is driven by the exhaust gas, so that the compressor 12a is rotated. A movable vane 121 of the turbine 12b is connected to an actuator 122, and accordingly, an angle of the movable vane 12 is controlled by the actuator 122.

On the downstream of the turbine 12b, an oxidation catalyst 32, a $NO_x$ purification catalyst 33 and an ammonia catalyst 34 are disposed in this order from the upstream side. The oxidation catalyst 32 oxidizes hydrocarbon and carbon monoxides in the exhaust gas, and converts nitrogen monoxides (to be referred to as "NO", hereunder) into $NO_x$ mainly containing nitrogen dioxides (to be referred to as "$NO_2$" hereunder) to perform the function of adjusting a ratio between NO and $NO_2$ contained in the exhaust gas to a ratio appropriate for the $NO_x$ reduction reaction described later. The $NO_x$ purification catalyst 33 reductively purifies $NO_x$. For the reduction of $NO_R$, in the present embodiment, ammonia as a reducing agent is added to the exhaust gas on the upstream of the $NO_x$ purification catalyst 33.

In the present embodiment, considering the storability of ammonia, urea being the ammonia precursor is stored in an aqueous solution state. It is possible to ensure the safety by storing ammonia in a urea state.

To a tank 41 storing the urea water, a urea water supply pipe 42 is connected. To a tip end of the urea water supply pipe 42, an injection nozzle 43 for the urea water is attached. To the urea water supply pipe 42, a feed pump 44 and a filter 45 are disposed in this order from the upstream side. The feed pump 44 is driven by an electric motor 441. The number of revolutions of the electric motor 441 is controlled based on a signal from a SCR control unit (to be referred to as "SCR-C/U, hereunder) 61, so that a discharge amount of the feed pump 44 is adjusted. Further, on the downstream of the filter 45, a urea water return pipe 46 is connected to the urea water supply pipe 42. To the urea water return pipe 46, a pressure control valve 47 is disposed, and configured so that the surplus urea water of amount exceeding a specified pressure is returned to the tank 41.

The injection nozzle 43 is an air-assist type injection nozzle, and includes a body 431 and a nozzle portion 432. To the body 431, the urea water supply pipe 42 is connected, and also, an air supply pipe 48 for supplying the assist air is connected. The air supply pipe 48 is connected to an air tank (not shown in the figure), and the assist air is supplied from this air tank. The nozzle portion 432 is disposed on the upstream of the NO purification catalyst 33, so as to pass through a case of the NO purification catalyst 33 and the ammonia catalyst 34 from a side surface of the case. An injection direction of the nozzle portion 432 is set in parallel to the exhaust gas flow, and toward an end surface of the NO purification catalyst 33.

When the urea water is injected, urea in the injected urea water is hydrolyzed by the exhaust heat, so that ammonia is generated. Generated ammonia functions as a reducing agent for NOx on the $NO_x$ purification catalyst 33, to reduce $NO_x$. The ammonia catalyst 34 is for purifying slip ammonia which passed through the $NO_x$ purification catalyst 33 without contributing to the $NO_x$ reduction. Since ammonia has an irritating odor, it is not preferable to discharge ammonia without purification. The oxidation reaction of $NO_x$ on the oxidation catalyst 32, the hydrolysis reaction of urea, the $NO_x$ reduction reaction on the $NO_x$ purification catalyst 33, and the oxidation reaction of slip ammonia on the ammonia catalyst 34 are expressed by the following formulas (1) to (4). Incidentally, in the present embodiment, the NOx purification catalyst 33 and the ammonia catalyst 34 are integrated in a single case. However, these catalysts 33, 34 may be respectively contained in separate cases.

$$NO + 1/2 O_2 \rightarrow NO_2 \tag{1}$$

$$(NH_2)_2CO + H_2O \rightarrow 2NH_3 + CO_2 \tag{2}$$

$$NO + NO_2 + 2NH_3 \rightarrow 2N_2 + 3H_2O \tag{3}$$

$$4NH_3 + 3O_2 \rightarrow 2N_2 + 6H_2O \tag{4}$$

Further, the exhaust passage 31 is connected to the intake passage 11 via an EGR pipe 35. To the EGR pipe 35, an EGR valve 36 is disposed. To the EGR valve 36, an actuator 361 is connected, so that an opening degree of the EGR valve 36 is controlled by the actuator 361.

In the exhaust passage 31, a temperature sensor 71 for detecting the temperature of the exhaust gas which is not yet added with the urea water, is disposed between the oxidation catalyst 32 and the NO purification catalyst 33. On the downstream of the ammonia catalyst 34, there are disposed a temperature sensor 72 for detecting the temperature of the exhaust gas after the reduction, and a NO sensor 73 for detecting the concentration of NO contained in the exhaust gas after the reduction. Further, in the tank 41, a urea sensor 74 for detecting the concentration (corresponding to "a state parameter") of urea contained in the urea water is disposed.

Detection signals from the temperature sensors 71 and 72, the NO sensor 73 and the urea sensor 74 are output to the SCR-C/U 61. The SCR-C/U 61 calculates and sets an optimum urea water injection amount based on the input signals, and outputs a command signal according to the set urea water injection amount to the injection nozzle 43. Further, the SCR-C/U 61 is connected to the engine C/U 51 so as to be communicable with each other in bi-directions, and outputs the detected urea concentration to the engine C/U 51. On the other hand, on the engine 1 side, an ignition switch, a start switch, a crank angle sensor, a vehicle speed sensor, an accelerator sensor and the like are disposed, and detection signals from them are input to the engine C/U 51. The engine C/U 51 calculates an engine rotating number NE based on the signal input from the crank angle sensor. The engine C/U 51 outputs information such as a fuel injection amount and the like, which is necessary for the injection control of the urea water, to the SCR-C/U 61.

Figure 2:
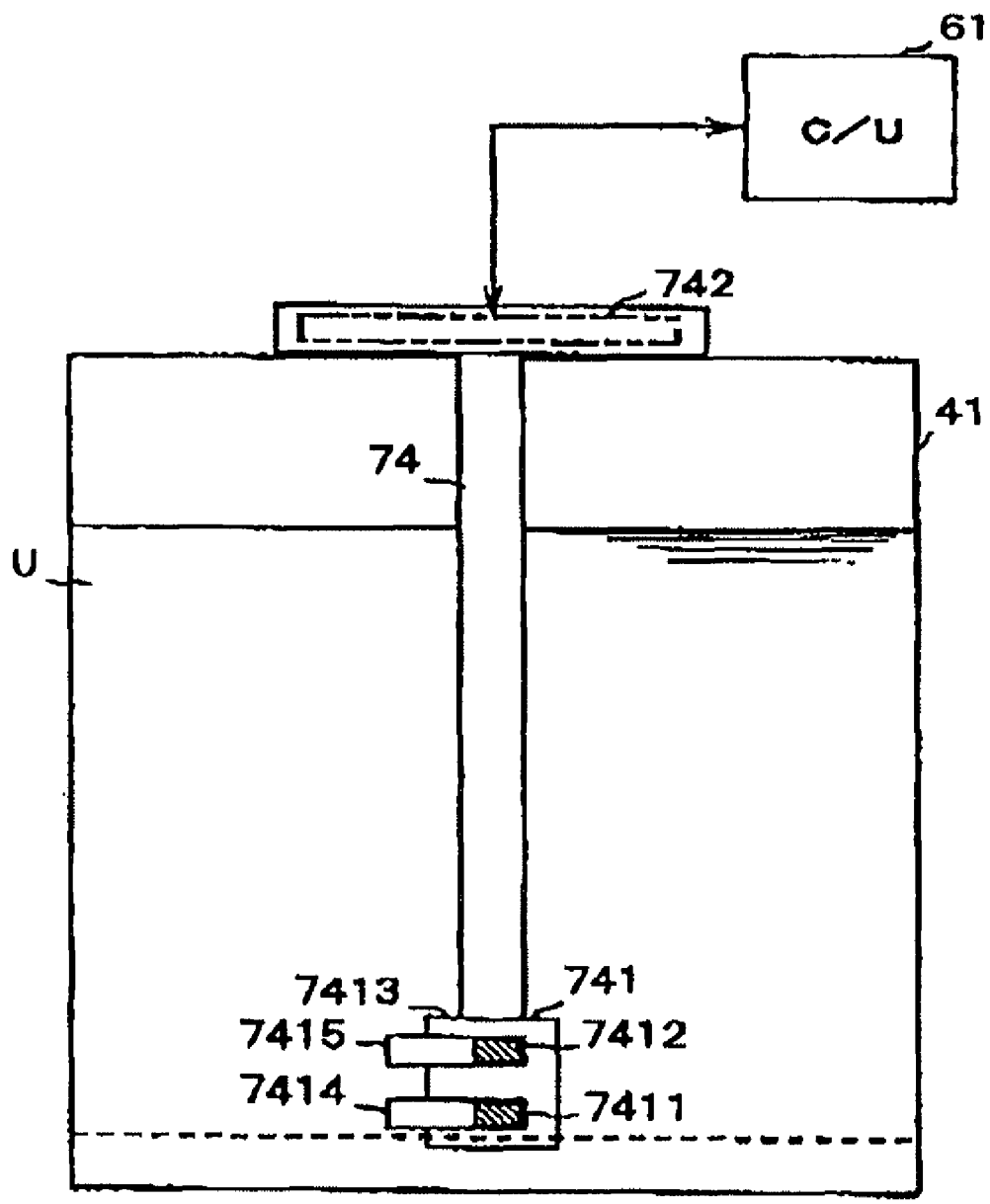
FIG. 2 is a diagram showing a configuration of a urea sensor.

FIG. 2 shows a configuration of the urea sensor 74.

The urea sensor 74 has a configuration similar to that of a flow meter disclosed in Japanese Unexamined Patent Publication No. 2001-228004, and detects the urea concentration based on electrical characteristic values of two temperature sensing elements.

The flow meter disclosed in the above Unexamined Patent Publication No. 2001-228004 includes a first sensor element with a heater function and a second sensor element without a heater function. The former first sensor element has a heater layer and a resistance temperature sensing layer (to be referred to as "first sensing layer", hereunder) as the temperature sensing element, formed on the heater layer in an insulating state. The latter second sensor element has a resistance temperature sensing layer (to be referred to as "second sensing layer", hereunder) as the temperature sensing element, but does not have a heater layer. The respective sensor elements are integrated within a resin case and are connected to one ends of fin plates serving as heat transfer bodies.

In the present embodiment, a sensor element part 741 of the urea sensor 74 is configured to include the above first and second sensor elements. The sensor element part 741 is disposed in the vicinity of a bottom of the tank 41, and is used in a state of being dipped into the urea water, at the detection of the urea concentration. Further, respective fin plates 7414 and 7415 pass through a case 7413 to expose to the inside of the tank 41.

A circuit section 742 is connected to the heater layer and the resistance temperature sensing layer (or first sensing layer) of the first sensor element 7411, and also to the resistance temperature sensing layer (or second sensing layer) of the second sensor element 7412. The circuit section 742 supplies the electric current to the heater layer to heat the first sensing layer, and also detects a resistance value Rn1 of the heated first sensing layer and a resistance value Rn2 of the second sensing layer which is not directly heated. The resistance temperature sensing layer has a characteristic in which a resistance value thereof is changed in proportion to the temperature. The circuit section 742 calculates the concentration Dn as follows, based on the detected Rn1 and Rn2. Incidentally, the urea sensor 74 has both of a function of detecting the urea concentration and a function of judging a residual amount of the urea water.

Figure 3:
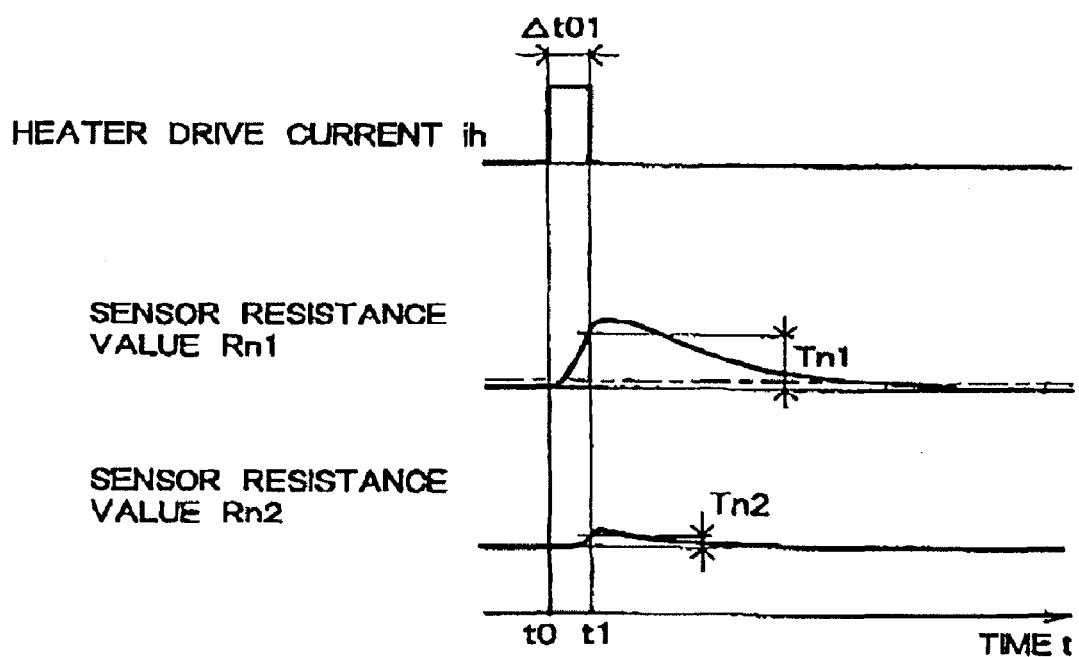
FIG. 3 is a graphical view showing the principle of concentration detection using the urea sensor.

FIG. 3 shows the principle of concentration detection and residual amount judgment.

The heating by the heater layer is performed by supplying a heater drive current ih to the heater layer for a predetermined period of time $\Delta t01$. The circuit section 742 detects the resistance values Rn1 and Rn2 of the respective resistance temperature sensing layers at a time point t1 at which the electric power supply to the heater layer is shut off, and also, calculates a temperature difference $\Delta Tmp12$ ($=Tn1-Tn2$) between the resistance temperature sensing layers at the time point. The temperature difference between the resistance temperature sensing layers is changed according to a characteristic of heat transfer via the urea water as a medium, and accordingly, this heat transfer characteristic is changed according to the urea concentration. Therefore, it is possible to convert the calculated $\Delta Tmp12$ to calculate the concentration Dn. Further, based on the calculated $\Delta Tmp12$, it is possible to judge whether or not an amount of the urea water retained in the tank 41 is deficient.

Incidentally, in the present embodiment, the configuration is such that the first sensing layer is in contact with the urea water via the fin plate 7414 in the first sensor element 7411. However, the configuration may be such that a measuring chamber, to which the urea water in the tank 41 is introduced, is formed in the sensor element part 741, and the first sensing layer is heated by the heater via the urea water in the measuring chamber. In this case, the first sensing layer and the urea water are directly in contact with each other.

Next, there will be described an operation of the SCR-C/U 61 with reference to flowcharts.

Figure 8:
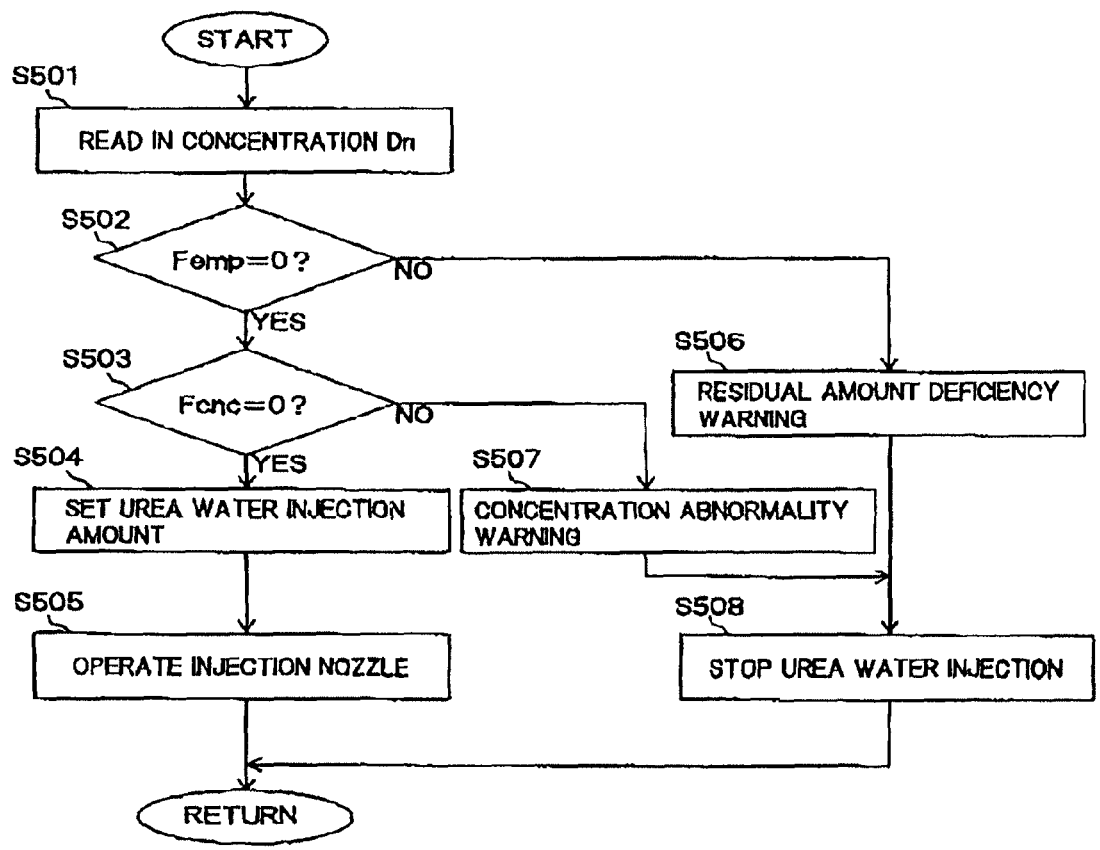
FIG. 8 is a flowchart of urea water injection control routine.

The operation of the SCR-C/U 61 according to the present embodiment will be described roughly as follows. Namely, the SCR-C/U 61 performs a detection permission judgment (FIG. 4: detection permission routine), and only when the concentration detection is permitted by this judgment, actually conducts a detection of the concentration Dn. When the detected concentration Dn is within a predetermined range defined as a normal region, the SCR-C/U 61 judges that a predetermined abnormality on the urea water does not occur, and outputs the concentration Dn. On the other hand, when the detected concentration Dn is without the predetermined range, the SCR-C/U 61 outputs the concentration Dn, but judges that an abnormality on the residual amount of the urea water or the concentration thereof occurs as the predetermined abnormality. In the present embodiment, the abnormality judgment on the residual amount of the urea water (to be referred to as "residual amount abnormality judgment", hereunder) is made when the concentration Dn is within a region above the predetermined range, whereas the abnormality judgment on the concentration of the urea water (to be referred to as "concentration abnormality judgment", hereunder) is made when the concentration Dn is within a region below the predetermined range. Further, in the present embodiment, in making the respective abnormality judgments, the SCR-C/U 61 adds up, as "determinate condition", error counters CNTc and CNTe by each predetermined value at every time when each of the abnormalities is detected, and actually makes the abnormality judgments on condition that the error counters CNTc and CNTe reach predetermined values CNTclim and CNTelim (FIG. 6; concentration detection and abnormality judgment routine). When either the residual amount abnormality judgment or the concentration abnormality judgment is made, the SCR-C/U 61 outputs a signal for stopping the urea water injection to the injection nozzle 43 (FIG. 8; urea water injection control routine).

Figure 4:
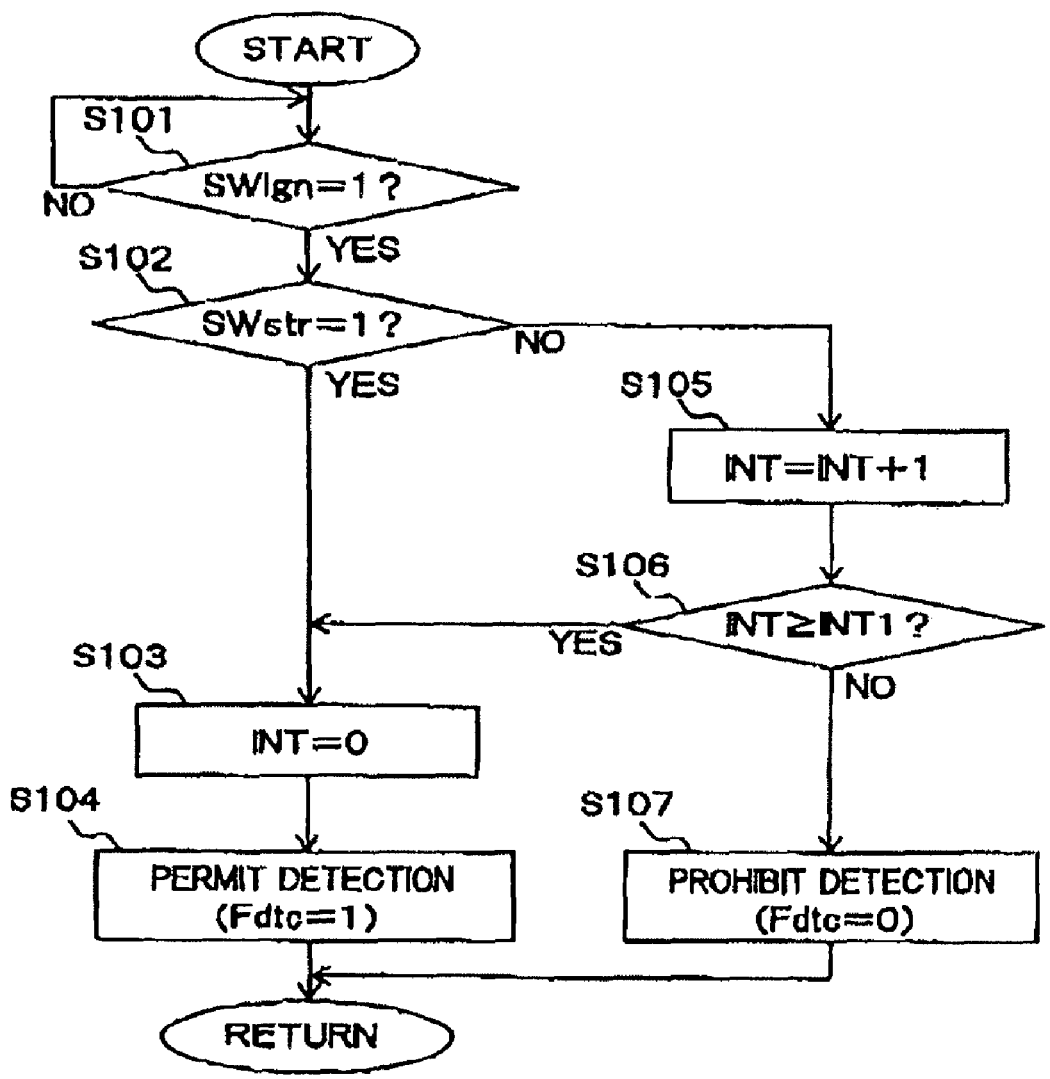
FIG. 4 is a flowchart of detection permission routine.

FIG. 4 is a flowchart of the detection permission routine. This routine is activated when the ignition switch is turned on, and thereafter, is repetitively executed at each predetermined time. By this routine, the detection of the concentration Dn is permitted or prohibited.

In S101, an ignition switch signal SWign is read in, and it is judged whether or not the signal SWign is 1. When the signal SWign is 1, it is judged that the ignition switch is turned on, and the routine proceeds to S102.

In S102, a start switch signal SWstr is read in, and it is judged whether or not the signal SWstr is 1. When the signal SWstr is 1, it is judged that the start switch is turned on, and accordingly the engine 1 starts to operate, and the routine proceeds to S103 in order to make the permission judgment. This is because, at the start of the engine 1, there is high probability that a considerable time has elapsed after occurrence of the previous stopping of the engine 1, and therefore the urea water is stable in the tank 41. On the other hand, when the signal SWstr is not 1, the routine proceeds to S105.

In S103, a detection interval INT is reset to 0.

In S104, a permission judgment flag Fdtc is set to 1, and the permission judgment is made.

In S105, the detection interval INT is counted up by 1 (INT=INT+1).

In S106, it is judged whether or not the detection interval INT after counted up reaches a predetermined value INT1. When the detection interval INT reaches the predetermined value INT1, it is judged that the detection interval necessary for the concentration Dn detection is ensured, and the routine proceeds to S103. On the other hand, when the detection interval INT does not reach the predetermined value INT1, it is judged that the necessary detection interval is not ensured, and the routine proceeds to S107 in order to make a prohibition judgment.

In S107, the permission judgment flag Fdtc is set to 0, and the prohibition judgment is made.

Figure 5:
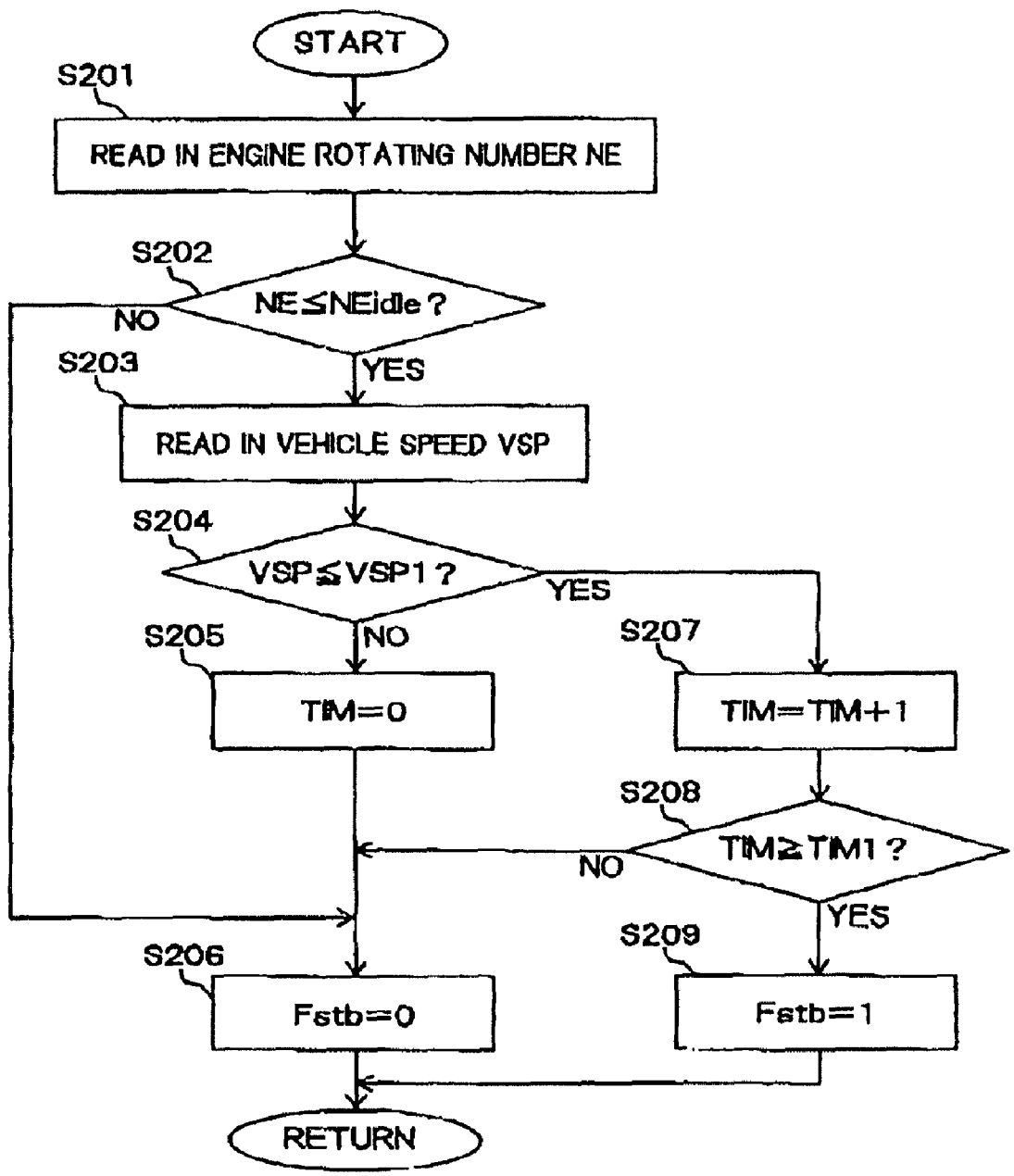
FIG. 5 is a sub-routine of stability judgment process in the above routine.
Figure 6:
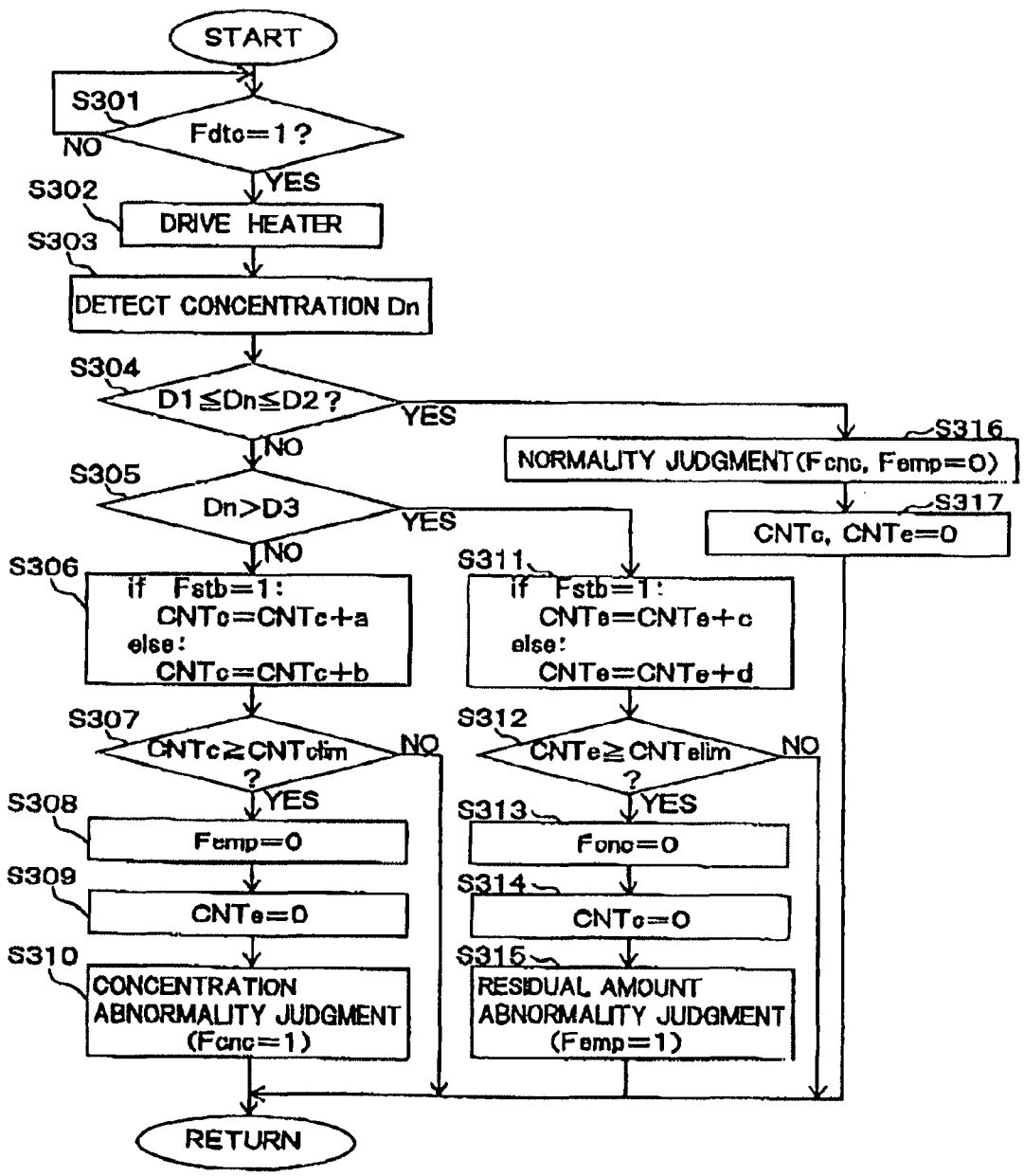
FIG. 6 is a flowchart of concentration detection and abnormality judgment routine.

FIG. 5 is a flowchart of the stability judgment routine. This routine is repetitively executed at each predetermined time. By this routine, it is judged whether or not the urea water is stable in the tank 41, and a stability judgment flag Fstb according to the judgment result is set. The set flag Fstb is reflected to the concentration detection and abnormality judgment routine (FIG. 6).

In S201, the engine rotating number NE is read in.

In S202, it is judged whether or not the read NE is decreased to a predetermined idle judgment rotating number NEidle or less. When the read NE is decreased to NEidle or less, the routine proceeds to S203, whereas when the read NE is not decreased to NEidle or less, the routine proceeds to S206.

In S203, the vehicle speed VSP is read in.

In S204, it is judged whether or not the read VSP is decreased to a predetermined value VSP1 (for example, 0) or less. When the read VSP is decreased to VSP1 or less, the routine proceeds to S207, whereas when the read VSP is not decreased to VSP1 or less, the routine proceeds to S205. The predetermined value VSP1 is not limited to 0, and can be set to be larger than 0, as a vehicle speed maximum value capable of judging that the vehicle substantially stops. This is because, even though the vehicle does not completely stop, when the vehicle speed is low to some extent, and accordingly it is ensured that the large deceleration does not occur, the swaying of the urea water in the tank 41 is attenuated so that the state of the urea water is shifted to be stable.

In S205, an elapsed time TIM is reset to 0.

In S206, it is judged that the urea water is not in the stable state, the stability judgment flag Fstb is set to 0.

In S207, the elapsed time TIM is counted up by 1 (TIM=TIM+1).

In S208, it is judged whether or not the time TIM after counted up reaches a stabilization time TIM1. When the time TIM reaches the time TIM1, the routine proceeds to S209, whereas when the time TIM does not reach the time TIM1, the routine proceeds to S206. Incidentally, it is preferable that the stabilization time TIM1 is set to have a large value as the deceleration is large, provided that the stabilization time TIM1 is changed according to the deceleration at the vehicle stop. This is because, when the vehicle suddenly stops, the swaying of the urea water is increased just after the vehicle stop, and consequently, a long period of time is required until the urea water is stabilized.

In S209, the stability judgment flag Fstb is set to 1, and it is judged that the urea water is in the stable state.

FIG. 6 is a flowchart of the concentration detection and abnormality judgment routine. This routine is executed by the SCR-C/U 61 and the circuit section 742 when the permission judgment flag Fdtc is set to 1. S302 and S303 are processing performed by the circuit section 742. By this routine, the concentration Dn is detected, and also, predetermined abnormalities on the urea water are detected and judged.

In S301, the permission judgment flag Fdtc is read in, and it is judged whether or not the read flag Fdtc is 1. Only when the flag Fdtc is 1, the routine proceeds to S302.

In S302, in order to detect the concentration Dn, the electric current is supplied to the heater layer of the urea sensor 74, so that the first sensing layer is directly heated, and also, the second sensing layer is indirectly heated using the urea water as the medium.

In S303, the concentration Dn is detected. The detection of the concentration Dn is performed such that the resistance values Rn1 and Rn2 of the heated resistance temperature sensing layers are detected, and also the temperature difference $\Delta Tmp12$ between the resistance temperature sensing layers according to a difference between the detected resistance values Rn1 and Rn2 is calculated, and the calculated $\Delta Tmp12$ is converted into the concentration Dn.

In S304, it is judged whether or not the detected concentration Dn is within the predetermined range (corresponding to "normal region") having a lower limit value of a first value D1 and an upper limit value of a second value D2 which is larger than the first value D1. When the detected concentration Dn is within the predetermined range, the routine proceeds to S316, whereas when the detected concentration Dn is not within the predetermined range, the routine proceeds to S305.

In S305, it is judged whether or not the concentration Dn is larger than a predetermined third value D3. When the concentration Dn is larger than the value D3, the routine proceeds to S311, whereas when the concentration Dn is equal to or smaller than the value D3, the routine proceeds to S306. The predetermined value D3 is set to an intermediate value between an output Dn obtained in the state where the urea sensor 74 is in the urea water and an output Dn obtained in the state where the urea sensor 74 is in the air. Incidentally, in the present embodiment, the predetermined value D3 is set to a different value from the value D2 (namely, larger than D2), but may be set to an equal value to the value D2.

In S306, a point "a" or "b" of a value according to the stability judgment flag Fstb is added to a concentration error counter CNTc. Namely, when it is judged that the flag Fstb is 1 and the urea water is stable in the tank 41, the point "a" which has a relatively large value is added (CNTc=CNTC+ "a"), whereas when it is judged that the flag Fstb is 0 and the urea water is not stable, the point "b" which is smaller than the point "a" is added (CNTc=CNTc+"b":"b"<"a"). This is because when the urea water is left stable, variation in the heat transfer characteristic due to the urea water agitation is small, and accordingly, the high reliability of the concentration Dn obtained is to be reflected onto the abnormality judgment.

In S307, it is judged whether or not the counter CNTc after counted up reaches a predetermined value CNTclim. When the counter CNTc reaches the value CNTclim, the routine proceeds to S308, whereas when the counter CNTc does not reach the value CNTclim, the routine is returned.

In S308, a residual amount abnormality judgment flag Femp is set to 0.

In S309, a residual amount error counter CNTe is reset to 0.

In S310, the concentration abnormality judgment that the urea water is a dilute state equal to or near the water, or that a different kind of aqueous solution from the urea water is stored in the tank 41 is made, and a concentration abnormality judgment flag Fcnc is set to 1. Incidentally, in the present embodiment, simple one concentration abnormality judgment is made when the concentration less than the first value D1 is detected. However, the configuration may be such that different concentration abnormality judgment flags are set for the case where the water is filled in the tank 41 and for the case where the urea water is diluted, and the concentration Dn and a fourth value D4 (for example, 0) smaller than D1 are compared with each other, to thereby distinguish between the abnormalities for the respective cases.

In S311, a point "c" or "d" of a value according to the stability judgment flag Fstb is added to the residual amount error counter CNTe. Namely, when it is judged that the flag Fstb is 1, and the urea water is stable in the tank 41, the point "c" which has a relatively large value is added (CNTe=CNTe+"c"), whereas when it is judged that the urea water is not stable, the point "d" which is smaller than the point "c" is added (CNTe=CNTe+"d":"d"<"c"). This is because, the high reliability of the concentration Dn obtained when the urea water is stable is to be reflected, similarly to the case of the concentration error counter CNTc.

In S312, it is judged whether or not the counter CNTe after counted up reaches a predetermined value CNTelim. When the counter CNTe reaches the value CNTelim, the routine proceeds to S313, whereas when the counter CNTe does not reach the value CNTelim, this routine is returned.

In S313, the concentration abnormality judgment flag Fcnc is set to 0.

In S314, the concentration error counter CNTc is reset to 0.

In S315, the residual amount abnormality judgment that the amount of the urea water retained in the tank 41 is less than a predetermined amount (for example, the tank 41 is empty) is made, and the residual amount abnormality judgment flag Femp is set to 1.

In S316, the normality judgment is made, and the respective abnormality judgment flags Fcnc and Femp are set to 0.

In S317, the respective error counters CNTc and CNTe are reset to 0.

Figure 7:
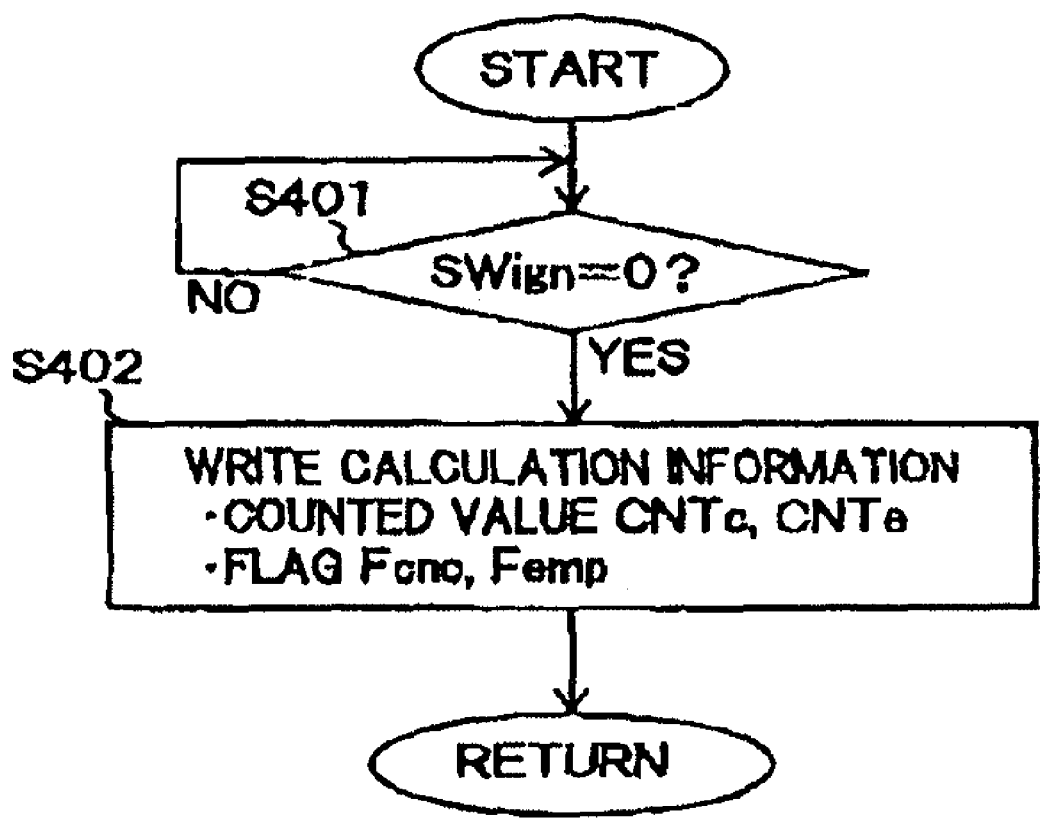
FIG. 7 is a flowchart of stop control routine.

FIG. 7 is a flowchart of the stop control routine. This routine is executed when the ignition switch is turned off.

In S401, the ignition switch signal SWign is read in, and it is judged whether or not the signal SWign is 0. When the signal SWign is 0, it is judged that the ignition switch is turned off, and the routine proceeds to S402.

In S402, various types of calculation information are written into a backup memory. The calculation information written into this memory are stored even after the ignition switch is turned off and the power supply is shut off, and in the next operation, are read in the concentration detection and abnormality judgment routine and the urea water injection control routine (S306, S503 and the like) described in the followings. In the present embodiment, as the calculation information, the respective error counters CNTc and CNTe and the respective abnormality judgment flags Fcnc and Femp are read in.

Next, there will be described one example of the urea water injection control adopting the concentration Dn, with reference to a flowchart shown in FIG. 8. This routine is executed at each predetermined time.

In S501, the concentration Dn is read in.

In S502, it is judged whether or not the residual amount abnormality judgment flag Femp is 0. When the flag Femp is 0, the routine proceeds to S503, whereas when the flag Femp is not 0, it is judged that the residual amount abnormality judgment is made, and the routine proceeds to S506.

In S503, it is judged whether or not a concentration abnormality judgment flag Fcon is 0. When the flag Fcon is 0, the routine proceeds to S504, whereas when the flag Fcon is not 0, it is judged that the concentration abnormality judgment is made, and the routine proceeds to S507.

In S504, the urea water injection amount is set. The setting of the urea water injection amount is performed such that a basic injection amount according to the fuel injection amount of the engine 1 and the output from the $NO_x$ sensor 73 is calculated, and also, the calculated basic injection amount is corrected with the concentration Dn. When the concentration Dn is high and the urea content per unit injection amount is high, the basic injection amount is corrected to be decreased. On the other hand, when the concentration Dn is low and the urea content per unit injection amount is low, the basic injection amount is corrected to be increased.

In S505, an operation signal according to the set urea water injection amount is output to the injection nozzle 43.

In S506, a residual amount warning lamp disposed on a control panel of a driver's seat is activated, so as to make a driver recognize that the residual amount of the urea water is deficient.

In S507, a concentration warning lamp disposed on the control panel is activated, so as to make the driver recognize that the urea concentration is excessively low.

In S508, the injection of the urea water is stopped. This is because the urea water of amount necessary for adding ammonia cannot be injected, not only when the residual amount of the urea water is deficient, but also when the urea concentration is excessively low and when not the urea water but the water or the like is stored in the tank 41. Incidentally, in the present embodiment, the injection of the urea water is stopped when the respective abnormality judgments are made. However, in addition to or in place of this control, a signal for decreasing the $NO_x$ emission amount itself from the engine 1 or a signal for restricting the output of the engine 1 may be output to the engine C/U 51. As a control of the former NO emission amount decreasing, the exhaust gas amount to be flown back via the EGR pipe 35 is changed to be larger than that at a normal time other than the abnormality judgment time. Further, as a control of the latter engine 1 output restriction, an output characteristic of the engine 1 relative to an accelerator control is differed from that at the normal time, for example, the fuel injection amount relative to an accelerator opening is changed to be smaller than that at the normal time.

In the present embodiment, the urea sensor 74 constitutes "a detecting unit" and the SCR-C/U 61 constitutes "a calculating unit". Further, in "the calculating unit" according to the present embodiment, the processing of S304 and S305 in the flowchart shown in FIG. 6 realizes a function as "an abnormality detecting section", the processing of S306, S307, S311 and S312 in the flowchart shown in FIG. 6 and the processing of S201 to S205, S207 and S208 in the flowchart shown in FIG. 5 realize a function as "an abnormality judging section", and further, the processing of S504 in the flowchart shown in FIG. 8 realizes a function as "an addition control section".

According to the present embodiment, the following effects can be achieved.

Figure 9:
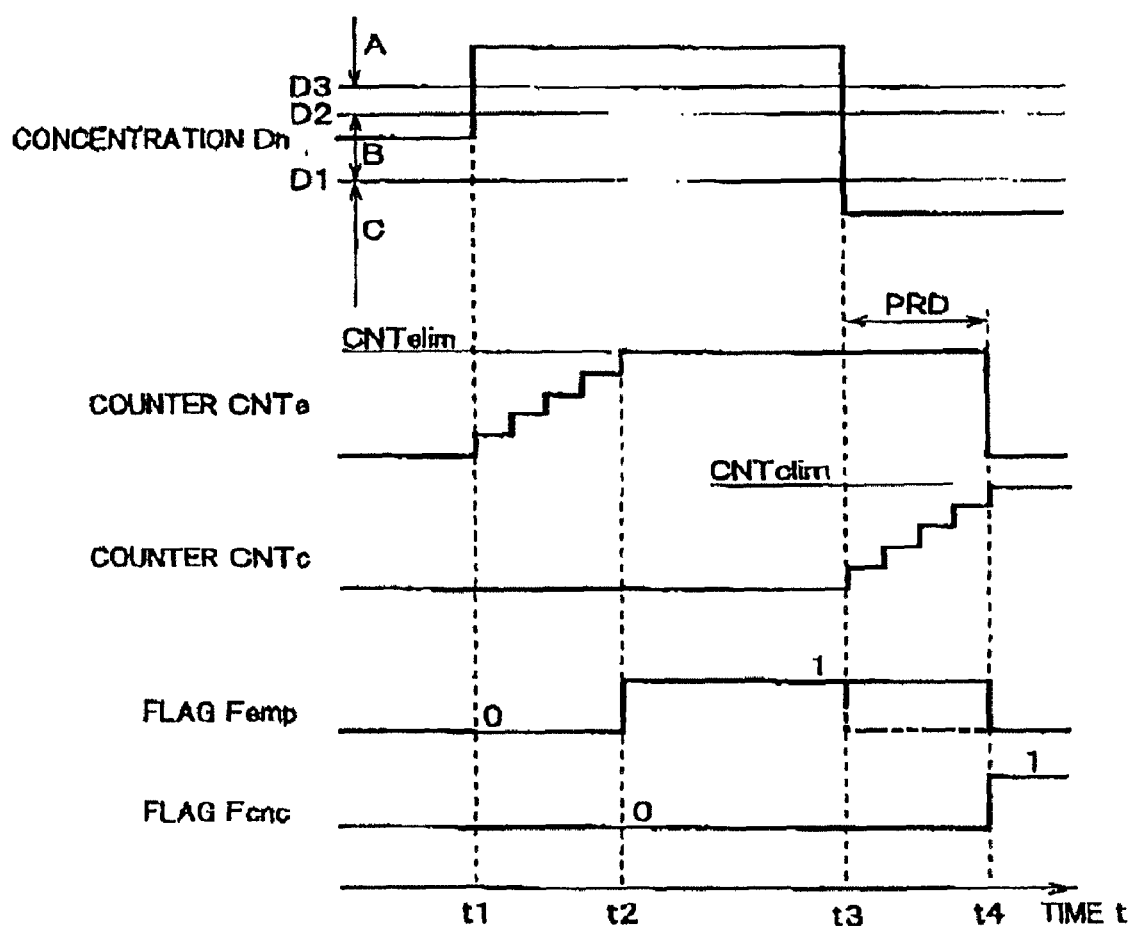
FIG. 9 is a time chart showing an operation of a SCR-C/U.

FIG. 9 is a time chart showing the operation of the SCR-C/U 61, and shows transitions of the error counters CNTc and CNTe, and the abnormality judgment flags Fcnc and Femp, for the case where, after the residual amount abnormality judgment (corresponding to "the first abnormality judgment") is made (the time t2), the water or the like is inadvertently or intentionally replenished so that the concentration Dn is directly shifted from a region A above a predetermined range B to another region C below the predetermined range B (the time t3).

In the present embodiment, in such a case, the residual amount abnormality judgment is maintained (CNTe=CNTelim, Femp=1; S307 in FIG. 6) for a period of time PRD until the concentration error counter CNTc is increased to reach the predetermined value CNTclim and the concentration abnormality judgment (corresponding to "the second abnormality judgment) is made, after the abnormal concentration Dn in the region C is detected (the time t3). Therefore, it is possible to avoid that, although the concentration Dn is excessively low and the $NO_x$ reduction is not sufficiently performed, the engine 1 is operated as per usual and also the injection is performed since the concentration error counter CNTc does not reach the predetermined value CNTclim, and consequently, avoid discharging unpurified $NO_x$ into the atmosphere.

Further, by making the stability judgment and by making the predetermined values "a" to "d" to be added to the error counters CNTc and CNTe different from each other according to the judgment results, it is possible to reduce an influence on the abnormality judgment of the concentration Dn which is variably detected as a result that the urea water is agitated due to the vibration during the vehicle running or the shock at the vehicle stop.

Further, by stopping the injection of the urea water when the respective abnormality judgments are made, and also, by decreasing the $NO_x$ emission amount from the engine 1, it is possible to prevent the $NO_x$ discharge as a result that the urea water of appropriate amount is not injected.

Furthermore, by restricting the output of the engine 1 when the respective abnormality judgments are made, it is possible to promote the appropriate replenishment of the urea water by the driver.

Moreover, by setting the urea water injection amount based on the concentration Dn, it is possible to inject the urea water in just proportion.

Incidentally, in the above description, the error counters CNTc and CNTe are adopted for both of the concentration abnormality judgment and the residual amount abnormality judgment. However, an error counter may be adopted for only one of the abnormality judgments (for example, the concentration abnormality judgment which is relatively susceptible to a misjudgment), and the other abnormality judgment (namely, the residual amount abnormality judgment) may be made just after the concentration Dn within the region A above the predetermined range B is detected.

Further, in the above description, the abnormality judgment precision is ensured by adopting the error counters CNTc and CNTe which are added with the predetermined values "a" to "d" at each abnormality detection time of the concentration or the residual amount. However, the configuration may be such that, by simply adopting the frequencies in place of the error counter, the abnormality judgment is made in the case where, after the detected concentration Dn is shifted from the outside of the region A or C to the region A or C, a predetermined proportion of the concentrations Dn detected for the predetermined number of frequencies are within the region A or C (for example, in the case where the concentrations Dn within the region A or C are repetitively detected for the predetermined number of frequencies).

Furthermore, in the above description, ammonia is generated by the urea hydrolysis. However, a catalyst for this hydrolysis is not especially specified. In order to enhance the hydrolysis efficiency, a hydrolysis catalyst may be disposed on the upstream of the $NO_x$ purification catalyst.

In the above description, the present invention has been described based on the preferred embodiment. However, the scope of the present invention is not limited to this description, and is determined based on the disclosure in the scope of claims in accordance with applied articles.

We claim:

1. A method of purifying an exhaust gas of an engine, which adds a reducing agent for NOx to the exhaust gas thereby reducing the NOx in the exhaust gas, the method comprising the steps of:

providing a tank that stores the reducing agent to be added to the exhaust gas, or a precursor thereof, in an aqueous solution state;

detecting a predetermined state parameter of the aqueous solution corresponding to a thermal characteristic of the aqueous solution stored in the tank; and performing a predetermined calculation on abnormalities of the aqueous solution based on the detected state parameter, wherein the step of performing the calculation comprises:

detecting predetermined abnormalities on the aqueous solution when the detected state parameter is within respective abnormal regions other than a predetermined region defined as a normal region;

making a first abnormality judgment or a second abnormality judgment upon an establishment of a predetermined determinate condition, wherein a time lag exists between the detection of the abnormality and the establishment of the determinate condition; and generating a signal corresponding to the first or second abnormality judgment, wherein a first abnormality is detected with respect to a concentration of the aqueous solution when the detected state parameter is within a first abnormal region on one side of the normal region, and a second abnormality is detected when the detected state parameter is within a second abnormal region on the opposite side to the first abnormal region across the normal region, wherein the first abnormality judgment is made in association with the first abnormality detection, and the second abnormality judgment is made in association with the second abnormality detection, and wherein the step of making the first abnormality judgment or the second abnormality judgment comprises:

canceling the first abnormality judgment with deviation of the detected state parameter from the first abnormal region after making the first abnormality judgment;

canceling the second abnormality judgment with deviation of the detected state parameter from the second abnormal region after making the second abnormality judgment; and maintaining, when the first abnormality is detected after making the second abnormality judgment as a result of the detected state parameter being directly shifted from the second abnormal region to the first abnormal region, the second abnormality judgment for a predetermined period of time from the detection of the first abnormality.

2. The method according to claim 1, wherein the first abnormality is detected as a dilution of the aqueous solution or a mixing of a different kind of aqueous solution in the tank, and the second abnormality is detected as a residual amount of deficiency of the aqueous solution.

3. The method according to claim 1, wherein the step of making the first abnormality judgment or the second abnormality judgment comprises setting a counter therein, which is increased by a predetermined value every time the first or second abnormality is detected, and wherein the first abnormality judgment or the second abnormality judgment is made based on a value of the counter.

4. The method according to claim 3, wherein the step of making the first abnormality judgment or the second abnormality judgment further comprises:

judging whether or not the aqueous solution is in a stable state in the tank; and varying the predetermined value between a first case where it is judged that the aqueous solution is in the stable state and a second case where it is judged that the aqueous solution is not in the stable state.

5. The method according to claim 3, wherein the counter is set on conducting of at least the first abnormality judgment, wherein the first abnormality judgment is made when the counter reaches a predetermined abnormality judgment value, and wherein the predetermined period of time is determined as being a period of time elapsing from a detection of the first abnormality until the counter reaches the predetermined abnormality judgment value.

6. The method according to claim 1, wherein the first abnormality judgment is made when the detected state parameter remaining inside the first abnormal region becomes a predetermined proportion with respect to a predetermined number of detection of frequencies after the detected state parameter has been shifted to the first abnormal region from outside thereof.

7. The method according to claim 1, wherein the step of performing the calculation further comprises generating a signal indicating that the addition of the reducing agent to the exhaust gas should be stopped when one of the first and second abnormality judgments is made.

8. The method according to claim 7, wherein the step of performing the calculation further comprises generating, when one of the first or second abnormality judgments is made, a signal indicating that an amount of NOx emission from the engine should be reduced to a level below that encountered when neither the first abnormality judgment nor the second abnormality judgments is made.

9. The method according to claim 7, wherein, when one of the first abnormality judgment and second abnormality judgment is made, a signal is generated indicating that an output characteristic of the engine should be varied relative to an accelerator control operation from that taken when neither the first abnormality judgment nor the second abnormality judgments is made, to thereby restrict an output of the engine.

10. The method according to claim 7, wherein the step of performing the calculation further comprises controlling an adding amount of the reducing agent to the exhaust gas based on the detected state parameter.

11. The method according to claim 1, further comprising a step of urging a driver to recognize an occurrence of abnormality when one of the first and second abnormality judgments is made.

12. The method according to claim 1, further comprising detecting the concentration of the aqueous solution using a concentration detecting unit, the concentration detecting unit comprising a sensor element part arranged inside of the tank and a circuit section connected to the sensor element part and configured to execute a predetermined calculation to calculate the concentration, wherein the sensor element part comprises:
a heater; and
a temperature sensing element having a property in which an electrical characteristic value thereof is changed according to the temperature, which is directly or indirectly in contact with the aqueous solution and also is heated by the heater, and wherein the method further comprises:
driving, with the circuit section, the heater;
detecting the electrical characteristic value of the heated temperature sensing element; and
calculating the concentration of the aqueous solution based on the detected electrical characteristic value.

13. The method according to claim 1, wherein the reducing agent is ammonia.

* * * * *

UNITED STATES PATENT AND TRADEMARK OFFICE
CERTIFICATE OF CORRECTION

| | | |
|---|---|---|
| PATENT NO. | : 7,842,267 B2 | |
| APPLICATION NO. | : 12/793604 | |
| DATED | : November 30, 2010 | |
| INVENTOR(S) | : Mitsuhiro Nishina et al. | |

It is certified that error appears in the above-identified patent and that said Letters Patent is hereby corrected as shown below:

In Column 5, Line 18: Replace "NO", with -- $NO_x$ --

In Column 10, Line 62: Replace "NO" with -- $NO_x$ --

Signed and Sealed this
Thirtieth Day of August, 2011

David J. Kappos
*Director of the United States Patent and Trademark Office*